US012136777B2

(12) United States Patent
Klingler

(10) Patent No.: US 12,136,777 B2
(45) Date of Patent: Nov. 5, 2024

(54) ELECTRICAL MULTI-CORE CABLE CRIMP FERRULE, AND CRIMPING METHOD

(71) Applicant: TE Connectivity Germany GmbH, Bensheim (DE)

(72) Inventor: Dominik Klingler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/853,415

(22) Filed: Jun. 29, 2022

(65) Prior Publication Data

US 2023/0006372 A1 Jan. 5, 2023

(30) Foreign Application Priority Data

Jul. 1, 2021 (DE) ......................... 102021117039.7

(51) Int. Cl.

| | |
|---|---|
| ***H01R 4/20*** | (2006.01) |
| ***H01B 7/08*** | (2006.01) |
| ***H01B 7/18*** | (2006.01) |
| ***H01R 4/18*** | (2006.01) |
| ***H01R 11/28*** | (2006.01) |
| ***H01R 13/6591*** | (2011.01) |
| ***H01R 13/6592*** | (2011.01) |
| ***H01R 43/048*** | (2006.01) |

(52) U.S. Cl.
CPC ........... *H01R 11/28* (2013.01); *H01B 7/0807* (2013.01); *H01B 7/18* (2013.01); *H01R 4/184* (2013.01); *H01R 4/206* (2013.01); *H01R 13/65912* (2020.08); *H01R 13/6592* (2013.01); *H01R 43/048* (2013.01)

(58) Field of Classification Search
CPC ........ H01R 4/206; H01R 4/184; H01R 11/28; H01R 13/65912; H01R 13/6592
See application file for complete search history.

(56) References Cited

U.S. PATENT DOCUMENTS

| | | | | |
|---|---|---|---|---|
| 4,710,140 A | 12/1987 | Frawley | | |
| 7,479,033 B1 * | 1/2009 | Sykes | H01R 9/0518 | 439/578 |
| 10,707,597 B2 | 7/2020 | Bergner et al. | | |
| 2013/0164979 A1 * | 6/2013 | Dendas | H01R 9/0527 | 439/607.01 |

(Continued)

FOREIGN PATENT DOCUMENTS

| | | |
|---|---|---|
| DE | 102018121239 A1 | 3/2020 |
| FR | 3074614 A1 | 6/2019 |

(Continued)

OTHER PUBLICATIONS

German Office Action, Application No. 102021117039.7, Dated: Feb. 25, 2022, 5 pages.

(Continued)

*Primary Examiner* — Chau N Nguyen
(74) *Attorney, Agent, or Firm* — Barley Snyder

(57) ABSTRACT

A crimp ferrule includes an assembly portion assembled on a non-circular internal cross section of a multi-core cable and a diameter compensation portion forming a circular external cross section of the crimp ferrule on the multi-core cable. The assembly portion and the diameter compensation portion are arranged successively in an axial direction of the crimp ferrule.

16 Claims, 3 Drawing Sheets

(56) References Cited

U.S. PATENT DOCUMENTS

| | | | | |
|---|---|---|---|---|
| 2019/0097330 | A1* | 3/2019 | Bergner .................. | H01R 4/20 |
| 2020/0076179 | A1 | 3/2020 | Pichlmaier et al. | |

FOREIGN PATENT DOCUMENTS

| | | | | |
|---|---|---|---|---|
| JP | 5275138 | B2 | | 8/2013 |
| WO | WO 2011/152415 | | * | 12/2011 |
| WO | WO 2019/154788 | | * | 8/2019 |

OTHER PUBLICATIONS

Extended European Search Report dated Nov. 18, 2022, corresponding to Application No. 22182279.4-1201, 17 pages.
Korean Office Action dated Mar. 22, 2024 with English translation, corresponding to Application No. 10-2022-0080510, 17 pages.

* cited by examiner

ELECTRICAL MULTI-CORE CABLE CRIMP FERRULE, AND CRIMPING METHOD

CROSS-REFERENCE TO RELATED APPLICATIONS

This application claims the benefit of the filing date under 35 U.S.C. § 119(a)-(d) of German Patent Application No. 102021117039.7, filed on Jul. 1, 2021.

FIELD OF THE INVENTION

The present invention relates to a ferrule and, more particularly, to an electrical multi-core cable crimp ferrule.

BACKGROUND

In the electrical sector (electronics, electrical engineering, electrics, electric energy technology, etc.), a large number of electric connector devices, socket, pin and/or hybrid connectors etc. are known—referred to below as (electrical) connectors (also: mating connectors)—that serve to transmit electrical currents, voltages, signals and/or data with a wide bandwidth of currents, voltages, frequencies and/or data rates. In the field of low, medium or high voltages and/or currents, and in particular in the automotive sector, such connectors have to guarantee transmission of electrical power, signals and/or data permanently, repeatedly and/or for a short time after a comparatively long period of inactivity in mechanically stressed, warm, possibly hot, contaminated, damp and/or chemically aggressive environments. Owing to a wide range of applications, a large number of specially designed connectors are known.

Such a connector and, if applicable, the associated (e.g. in the case of a connector device) or higher-level housing (e.g. in the case of a connector device) thereof can be installed on an electrical line, a cable, a cable harness etc.—referred to below as an assembled (electrical) cable (also: electrical entity)—or to/in an electrical device, such as e.g. to/in a housing, to/on a lead frame, to/on a circuit board etc., of a (power-) electrical, electro-optical or electronic component or a corresponding aggregation etc. (electrical entities).

If a connector (with/without a housing) is located on a cable, a line or a cable harness, this is also called a flying (plug) connector or a plug, a socket or a coupling; if it is situated on/in an electrical, electro-optical or electronic component, aggregation etc., this is also referred to as a connector device such as a (built-in/mounted) connector, a (built-in/mounted) plug or a (built-in/mounted) socket. A connector on such a device is further often also referred to as a (plug) receptacle, pin header, pin strip or header. In the context of electrical power engineering (generating, converting, storing and transporting high-voltage electrical current in electricity grids, for example with three-phase high-voltage transmission), reference is made here to cable fittings because of their comparatively complex structure.

Such a connector must ensure proper transmission of electricity, wherein mutually corresponding and partially complementary connectors (connector and mating connector) usually have locking devices and/or fastening devices for permanent but generally releasable locking and/or fastening of the connector to/in the mating connector or vice versa. Furthermore, an electrical connecting device for a connector, e.g. comprising or at least having: an actual electrical contact element (terminal; usually formed materially in one piece or integrally, e.g. a (crimp) contact element etc.) or an electrical contact device (terminal; usually configured so as to be in one piece and from several or two parts, or materially integral, e.g. a (crimp) contact device), has to be held securely therein.

A connecting device may itself be formed from several parts. A connecting device may comprise or have e.g. two or more electrical terminals. This is the case e.g. with coaxial or twin axial or twisted-pair connecting devices which may comprise or have one or two inner, electrical terminals (male and/or female) and one outer terminal (shield contact sleeve). Furthermore, a ferrule (support sleeve) may be established within the outer terminal in the connecting device. In the case of a (pre-)assembled electrical cable, such a connecting device may be provided as a connector, that is to say without a housing, for example in a flying manner.

Efforts are continually being made to improve electrical connectors and their connecting devices, in particular due to miniaturization to make them more robust, design them more effectively and produce them at lower cost. Here, rules apply to HF-connecting devices (HF: high-frequency, transmission frequencies greater than 3 to greater than 300 MHz and well into the GHz range (approx. 150 GHz)) that are considerably different to those for conventional connecting devices (transmission frequencies lower than about 3 MHz), since the wave properties of electricity are particularly evident in HF-technology. In the case of electrical HF-plug connections, maintaining signal integrity is proving to be an ever-greater obstacle.

There is an observable trend for cable manufacturers to make the shields in multi-core cables, such as e.g. twisted-pair cables, twin axial cables etc., increasingly more oval because more and more manufacturers are placing the shields of the multi-core cables directly around the inner conductors of the multi-core cables instead of around additional fillers as before. However, the insulation sheaths of the multi-core cables remain substantially circular. The conventional crimp ferrules for crimp connecting devices of such multi-core cables are designed in such a way that they are suitable only for being crimped onto a substantially circular shield.

SUMMARY

A crimp ferrule includes an assembly portion assembled on a non-circular internal cross section of a multi-core cable and a diameter compensation portion forming a circular external cross section of the crimp ferrule on the multi-core cable. The assembly portion and the diameter compensation portion are arranged successively in an axial direction of the crimp ferrule.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
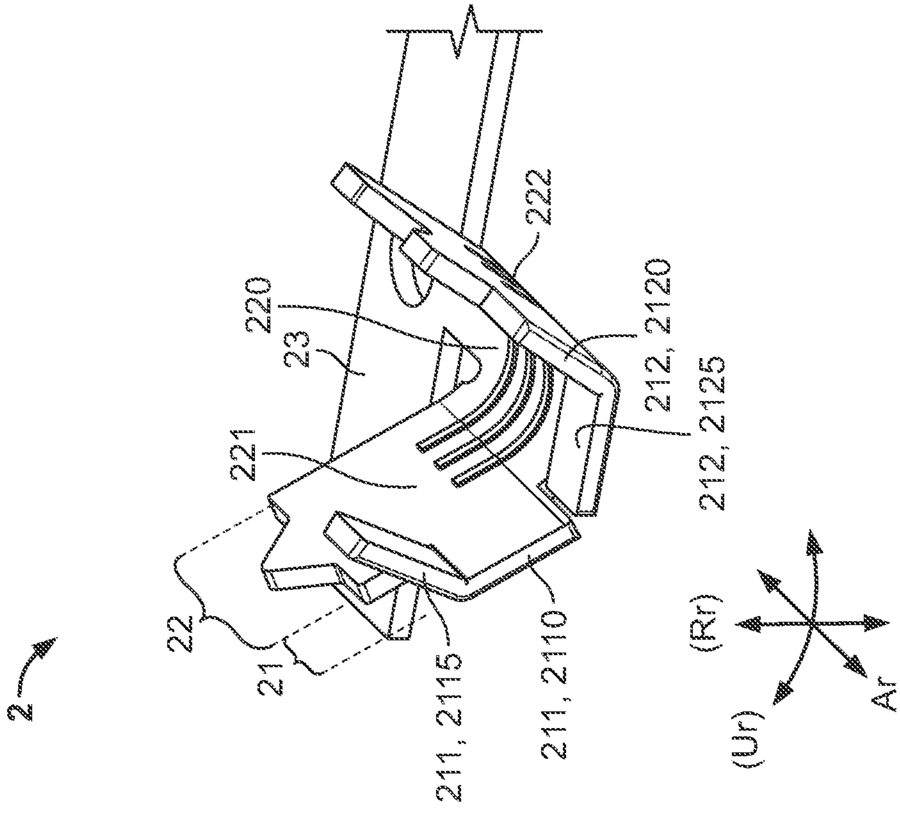
FIG. 2 is a perspective view of the crimp ferrule in a pre-bent state immediately prior to or during crimping.

The invention is explained in greater detail below on the basis of exemplary embodiments with reference to the appended drawings, which are diagrammatic and not to scale. Portions, elements, component parts, units, components and/or patterns which have an identical, unique or analogous configuration and/or function are identified by the same reference signs. A possible alternative which is not explained in the description, is not shown in the drawing and/or is not definitive, a static and/or kinematic reversal, a combination etc. with respect to the exemplary embodiments of the invention or a component, a pattern, a unit, a component part, an element or a portion thereof, can further be gathered from the description of the figures.

In the case of the invention, a feature (portion, element, component part, unit, component, function, variable etc.) can be of positive configuration, that is to say present, or of negative configuration, that is to say absent. In this specification, a negative feature is not explained explicitly as a feature if value is not placed on it being absent according to the invention. That is to say, the invention which is actually made and is not constructed by way of the prior art consists in omitting the said feature.

A feature of this specification can be used not only in a specified manner and/or way, but rather also in another manner and/or way (isolation, combination, replacement, addition, on its own, omission, etc.). It is possible, in particular, in the description, the patent claims and/or the drawing, to replace, add or omit a feature in the patent claims and/or the description on the basis of a reference sign and a feature which is assigned to it, or vice versa. Furthermore, a feature in a patent claim can be interpreted and/or specified in greater detail as a result.

The features of the description can also be interpreted as optional features; that is to say, each feature can be considered to be an optional or arbitrary feature, that is to say a feature which is not mandatory. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. Furthermore, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in more detail hereunder by exemplary embodiments of a variant of a multi-core cable crimp ferrule 2 according to the invention, hereunder referred to only as the crimp ferrule 2, in particular an HF crimp ferrule 2, for an electrical connecting device 0 of an electrical multi-core cable 5. Presently, the multi-core cable 5 may be formed e.g. as a twisted-pair cable 5, a twin axial cable 5, etc. Accordingly, the connecting device 0 may be formed as a multi-core connecting device 0, such as e.g. a twisted-pair connecting device 0, a twin axial connecting device 0 etc., and the crimp ferrule 2 may be formed as a twisted-pair crimp ferrule 2, a twin axial crimp ferrule 2, etc.

Although the invention is described and illustrated further in greater detail by way of exemplary embodiments, the invention is not restricted by way of the disclosed exemplary embodiments, but rather is of more fundamental nature. Other variations can be derived therefrom without departing from the scope of protection of the invention. The invention can be used in general in the electrical sector in the case of an electrical entity.

The drawing shows only those spatial portions of the subject matter of the invention which are necessary for understanding of the invention. Designations such as connector and mating connector, terminal and mating terminal etc. are to be interpreted synonymously, that is to say may be mutually interchangeable.

Figure 1:
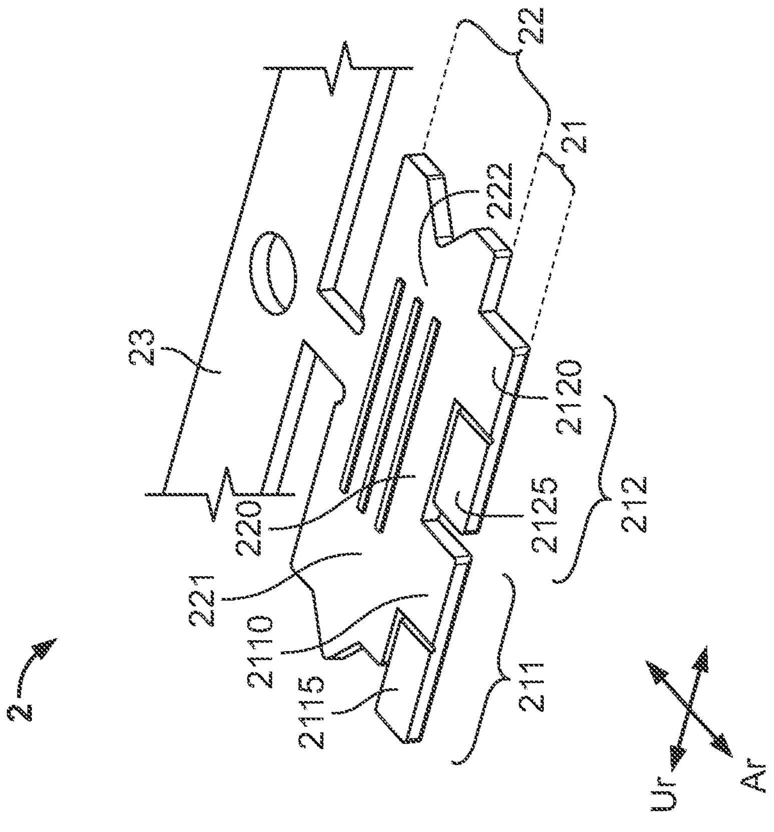
FIG. 1 is a perspective view of a crimp ferrule according to an embodiment for a multi-core cable in a stretched state.
Figure 3:
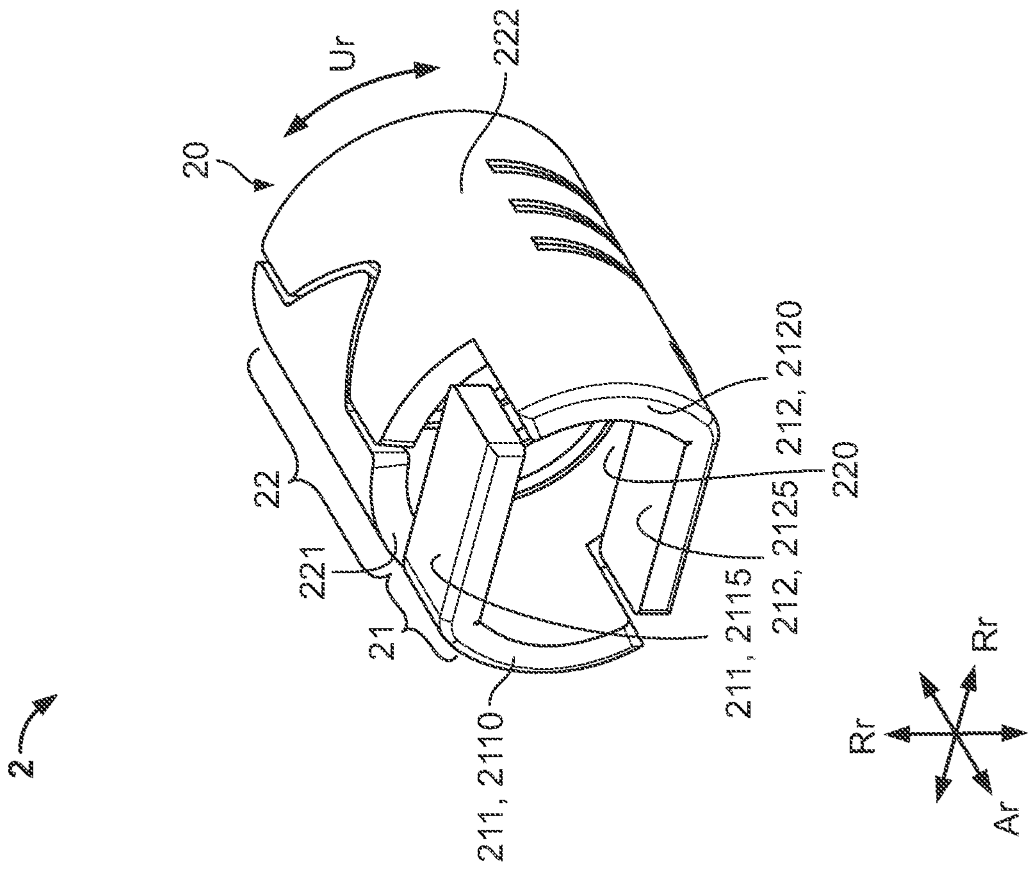
FIG. 3 is a perspective view of the crimp ferrule in a crimped state without a multi-core cable.

FIGS. 1 to 3 show a crimp ferrule 2 according to the invention in three successive stages for a method for the assembly of said crimp ferrule 2 by crimping (FIG. 1: flat at/on a reel 23; FIG. 2: pre-bent, still on the reel 23; FIG. 3: crimped and separated from the reel 23). The crimp ferrule 2 presently and ultimately comprises a first, front axial portion 21 as the axial assembly portion 21, and a second, rear axial portion 22 as the axial diameter compensation portion 22. It is possible for the crimp ferrule 2 to optionally have a further axial portion.

Both axial portions 21, 22 here are configured as a single and in an embodiment integral material tier of the crimp ferrule 2. In one embodiment the crimp ferrule 2 can be composed of a metallic (sheet metal) or metallized material tier of an in particular consistent thickness. The crimp ferrule 2 may additionally have a coating, deposition, galvanized surface, etc.

A materially (adhesively) integral configuration is understood to be a configuration of the crimp ferrule 2 in which the individual parts of the latter are mutually established in a materially integral manner (welding, soldering/brazing, adhesive bonding, laminating, etc.) and the crimp ferrule 2 is not able to be separated into the individual parts thereof without damaging one of the individual parts thereof. In this case, the bond can further be produced by a non-positively and/or positively locking connection (not in the case of an integral design).

An integral configuration is understood to be a configuration of the crimp ferrule 2 in which there is only a single component which can be divided only by destroying said single component. The component is manufactured from a single original piece (metal sheet, blank, etc.) and/or from a single original mass (molten metal), which in turn is inevitably integral. An internal bond is performed by adhesion and/or cohesion.

The axial assembly portion 21 assembles the crimp ferrule 2 on a substantially non-circular internal cross section 50 of the multi-core cable 5. In an embodiment, the axial assembly portion 21 can be plastically deformed on the multi-core cable 5. Applications and/or embodiments of the invention, in which the assembly portion 21 is also crimped onto a circular internal or external cross section of an electrical cable, are possible.

Figure 4:
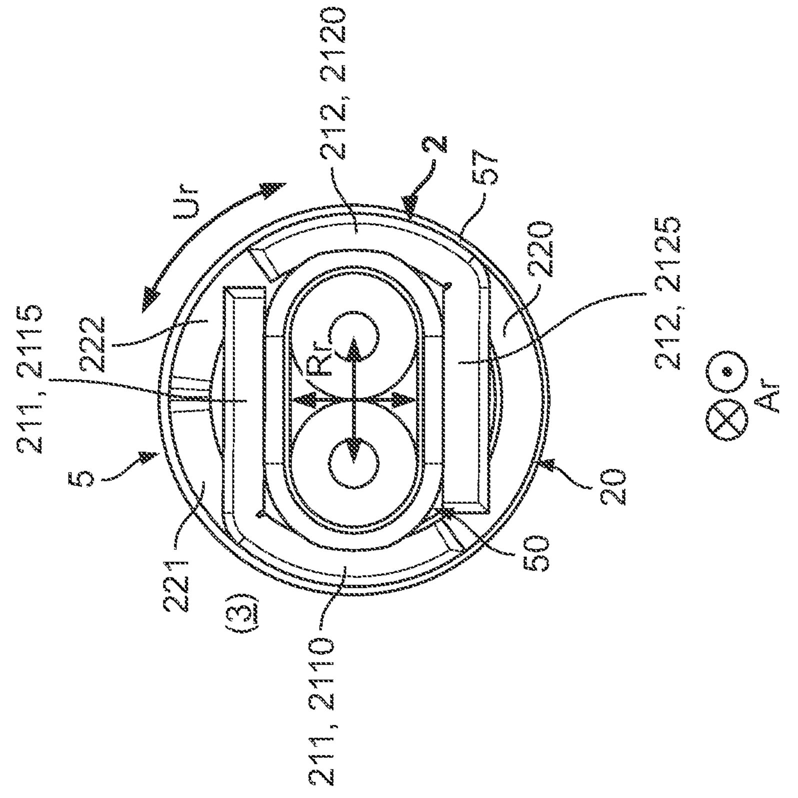
FIG. 4 is an end view of the crimp ferrule in an assembled state on a multi-core cable.
Figure 5:
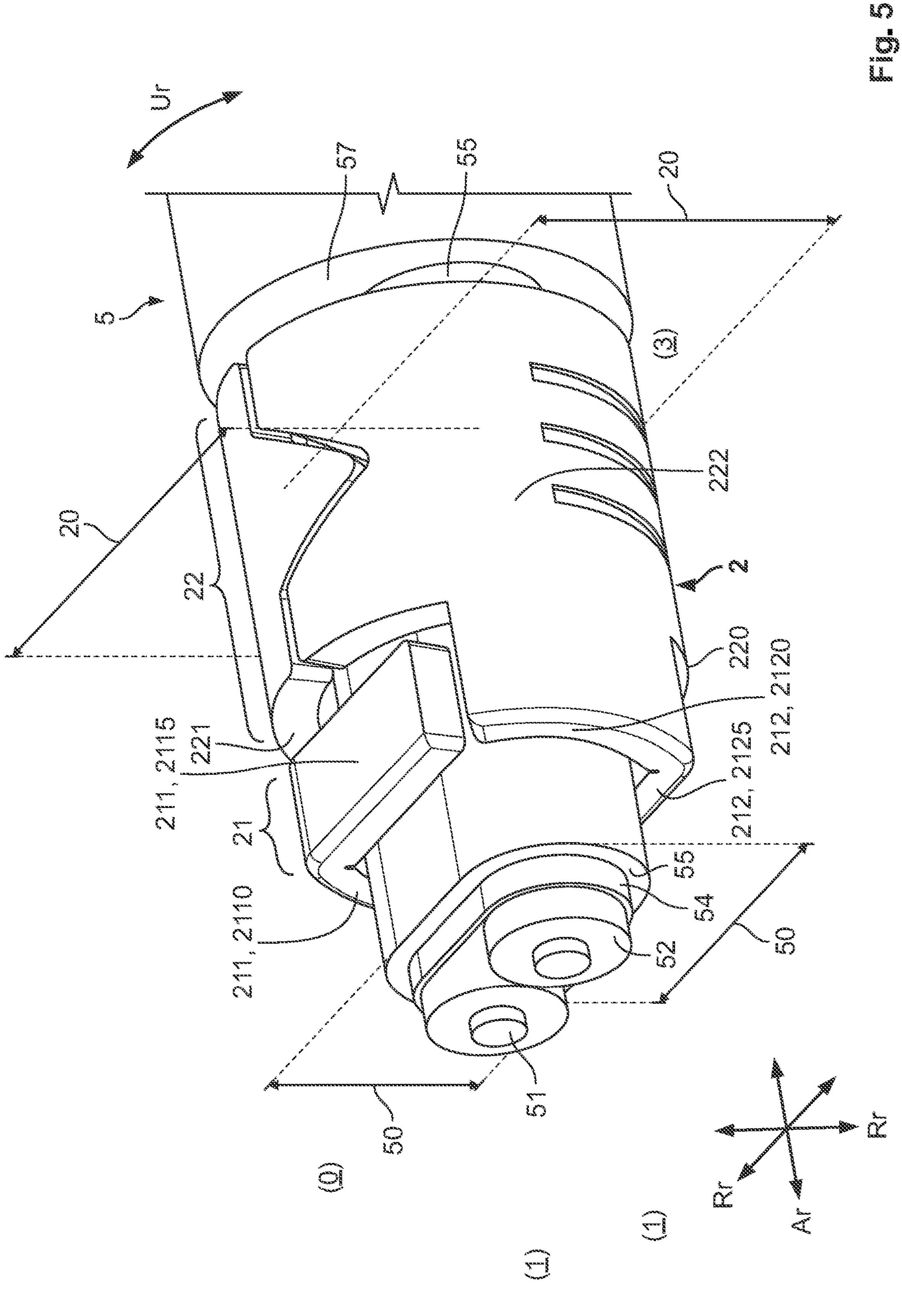
FIG. 5 is a perspective view of the crimp ferrule in the assembled state on the multi-core cable.

The multi-core cable 5, cf. FIGS. 4 and 5, includes, radially from the inside to the outside, two electrically insulated inner conductors 51, 52; an inner cable shield 54 (e.g. configured as a shield foil 54); a cable shield 55 lying radially thereabove (e.g. configured as a braided shield conductor 55); and a protective sheath 57 radially on the outside. Of course, another construction of the multi-core cable 5 may be used.

The axial diameter compensation portion 22 configures a substantially circular external cross section 20 of the crimp ferrule 2 on the multi-core cable 5, on/above the non-circular internal cross section 50; cf. also FIGS. 4 and 5. The assembly portion 21 and the diameter compensation portion 22 in the axial direction Ar here are arranged successively or adjacently as the crimp ferrule 2. In particular, the assembly portion 21 transitions seamlessly and/or integrally to the diameter compensation portion 22.

The non-circular internal cross section 50 may be an internal cross section of the multi-core cable 5 that is formed by a cable shield 55, in particular an outer cable shield, or by a layer of the multi-core cable 5 situated directly below a protective sheath 57. A non-circular internal cross section 50 is to be understood to be, for example, a (partially) elliptical or (partially) oval internal cross section of the multi-core cable 5 beyond a circular cross section, for example in comparison to a shape of an external cross section of the multi-core cable 5. By the crimp ferrule 2, the circular external cross section 20 of the crimp ferrule 2 can at least in portions be established over the non-circular internal cross section 50 of the multi-core cable 5. An external diameter of the circular external cross section 20 here may be in a range of an external diameter of a protective sheath 57 of the multi-core cable 5. In particular, the external diameter of the circular external cross section 20 is somewhat smaller than the external diameter of the protective sheath 57.

The diameter compensation portion 22 may be configured from a substantially single (circumferential) material tier 220, 221, 222 (sheet metal) and comprises a circumferential center portion 220 which, in an embodiment integrally, connects a (first) circumferential flank 221 of the crimp ferrule 2 to a (second) circumferential flank 222 of the crimp ferrule 2. A center of the circumferential center portion 220 may be radially opposite a crimp opening or a crimp slot (cf. FIG. 2) of the crimp ferrule 2. In one embodiment, the circumferential center portion 220 and/or the circumferential flanks 221, 222 can have a reinforcement device. Such a reinforcement device can be configured for example as at least one bead.

The diameter compensation portion 22 possesses an extent in the axial direction Ar, which also corresponds to an axial direction Ar of the connecting device 1 and the multi-core cable 5. Furthermore, the diameter compensation portion 22, depending on the crimped state thereof (cf. FIGS. 1 to 3), has an extent in the radial direction Rr and an extent in the circumferential direction Ur, wherein these directions Rr, Ur once again also correspond to those of the connecting device 1 and the multi-core cable 5.

The crimp ferrule 2 on the two circumferential flanks 221, 222 of the diameter compensation portion 22, so as to adjoin towards the front in the axial direction (direction of the plug face of the connecting device 1), has in each case at least one (crimp) assembly device 211, 212. The crimp ferrule 2 by the assembly devices 211, 212 is established on the non-circular internal cross section 50, i.e. able to be crimped onto the non-circular internal cross section 50. The diameter compensation portion 22 can be crimped onto an internal or external cross section of the cable 5. The assembly portion 21 does not have to be, but can be, crimped onto a non-circular internal cross section.

The assembly devices 211, 212 herein form the assembly portion 21 of the crimp ferrule 2. Depending on the number of assembly devices 211, 212, at least one such assembly device can also adjoin the circumferential center portion 220 in the axial direction Ar. All of the assembly devices 211, 212 here may be arranged on a single axial side of the crimp ferrule 2.

In the circumferential direction of the crimp ferrule 2, two, three, four or five assembly devices 211, 212 can be arranged in the crimp ferrule 2. At least two or more, or all, assembly devices 211, 212 here can be arranged so as to be substantially rotationally symmetrical or substantially anti-rotationally symmetrical in the crimp ferrule 2. Furthermore, two radially mutually opposite assembly devices 211, 212 and/or the radial cross sections thereof can be arranged so as to be substantially symmetrical with respect to a point in the crimp ferrule 2.

A respective assembly device 211, 212 has a (crimp) assembly tongue 2115, 2125 (cf. FIG. 2) which is able to be bent into the crimp opening or the crimp slot of the crimp ferrule 2. The assembly tongue 2115, 2125 is crimped primarily or substantially in the radial direction Rr, wherein a displacement of the assembly tongue 2115, 2125 in the axial direction Ar is impossible. The assembly tongue 2115, 2125 can be configured as a free longitudinal portion, lug, tab, protrusion, vane, blade, strip, leg or web.

The respective assembly device 211, 212 is integrally provided on a tongue root 2110, 2125, which in turn is configured integrally with the diameter compensation portion 22 and presently is configured integrally with a respective circumferential flank 221, 222.

In an embodiment, a respective tongue root 2110, 2120 is configured in the shape of a lug and as a substantially thinner (material thickness of the crimp ferrule 2) and curved cuboid. The respective tongue root 2110, 2120, not taking into account the (material) thickness thereof, here extends in the axial direction Ar and in the circumferential direction Ur. A curvature of the respective tongue root 2110, 2120 here corresponds to a curvature a region of the diameter compensation portion 22 that directly adjoins the tongue root 2110, 2120, or to a respective circumferential flank 221, 222 (cf. FIG. 3).

In an embodiment, a respective assembly tongue 2115, 2125 is configured in the shape of a lug and as a substantially thinner (material thickness of the crimp ferrule 2), rectilinear cuboid. However, it is possible for a curved cuboid to be used here. The latter means, for example, that the respective assembly tongue 2115, 2125 can be adapted to a curvature of the non-circular internal cross section 50. The respective assembly tongue 2115, 2125, not taking into account the (material) thickness thereof, as a function of a crimped state of the crimp ferrule 2, extends primarily or substantially in the circumferential direction Ur (FIG. 2) or in the circumferential direction Ur and radial direction Rr (FIG. 3).

Furthermore, immediately prior to crimping, only the diameter compensation portion 22 can possess a substantially U-shaped or V-shaped cross section; i.e. the assembly portion 21 does not possess any such shape.

By the assembly tongues 2115, 2125, the non-circular internal cross section 50 is able to be clamped, in such a manner the crimp ferrule 2 is able to be crimped onto the multi-core cable 5, and, when crimping, the circular external cross section 20 of the diameter compensation portion 22, or of the crimp ferrule 2, is furthermore able to be formed (bending the circumferential flanks 221, 222 towards one another). It is ensured as a result that the crimp ferrule 2 is able to be securely positioned on the multi-core cable 5 and does not shift thereon.

When crimping the crimp ferrule 2, a/the assembly tongue 2115, 2125 of a/the assembly device 211, 212 can: conjointly perform a movement of the tongue root 2110, 2120 thereof in the crimp ferrule 2 (cf. FIGS. 1 to 2), be able to be crimped proceeding from a circumferential position on the crimp ferrule 2 (cf. FIG. 2), and/or be able to be crimped in a radially inward manner onto the non-circular internal cross section 50 (cf. FIGS. 2 to 3). The assembly tongue 2115, 2125 in terms of the tongue root 2110, 2120 thereof performs in particular a pivoting movement, wherein the assembly tongue 2115, 2125 moves in the circumferential direction Ur as well as in the radial direction Rr.

The non-circular internal cross section 50 can be clamped by said assembly portion 21, and the non-circular internal cross section 50 is able to be elastically and/or plastically deformed in the process. The diameter compensation portion 22 of the crimp ferrule 2 can be defined in such a manner that only an elastic deformation of the non-circular internal cross section 50 is possible by way of said diameter compensation portion 22, said elastic deformation furthermore being only minor. The diameter compensation portion 22 is in particular not configured in such a manner that the internal cross section of the multi-core cable 5 is able to be plastically deformed, able to be pierced (cut open, torn open, perforated, etc.), etc. by way of said diameter compensation portion 22.

For a crimped state of the crimp ferrule 2 on/at the multi-core cable 5, the non-circular internal cross section 50 can be able to be clamped by an assembly device 211, 212 and a radially opposite region of the crimp ferrule 2, in particular a radially opposite assembly device 211, 212. Furthermore, for a/the crimped state, the non-circular internal cross section 50 can be able to be mounted by a single assembly device 211, 212 substantially on one side or two sides, or by a circumferential angle of somewhat less than approx.: 72°, 90°, 120° or 180°.

A radial force of a shield contact sleeve 3 to be provided, in particular crimped, on the crimp ferrule 2 is transferred to the circular external cross section 20 of the crimp ferrule 2 and the inner conductors of the multi-core cable 5 are thus not crushed. The crimp ferrule 2 may be configured as a support sleeve. A shield 55 of the multi-core cable 5 here can be folded over radially outside onto the crimp ferrule 2, and in particular can also be folded over radially on the outside onto the diameter compensation portion 22 of said crimp ferrule 2.

In a method according to the invention for assembling by crimping a crimp ferrule 2 onto a multi-core cable 5, a specified crimp ferrule 2 and a specific, (pre-)prepared multi-core cable 5 are made available in an infeed step. Subsequently, this crimp ferrule 2 is crimped onto a substantially non-circular internal cross section 50 of this multi-core cable 5 from which a protective sheath 57 has been stripped, for example (i.e. partially or completely stripped, e.g. pulled off or removed) (FIGS. 4 and 5). This is repeated depending on the number of crimp ferrules 2. The crimp-assembly method here may be a temporal portion of an assembly method of an electrical connecting device 0 which is explained hereunder.

In the crimp-assembly of a single crimp ferrule 2, the multi-core cable 5, by way of the non-circular internal cross section 50 thereof, is moved from above into the crimp ferrule 2 which is open at the top, and/or vice versa, and/or from the rear into the crimp ferrule 2 which is open at the rear, and/or vice versa. Substantially immediately thereafter, the crimp ferrule 2 is crimped onto the non-circular internal cross section 50 and/or onto/over the non-circular internal cross section 50, or to/onto the multi-core cable 5. This is to say that the crimp ferrule 2 is crimped onto an axial portion of the multi-core cable 5 that has such a non-circular internal cross section 50.

A free periphery of the crimp ferrule 2 extending in the longitudinal direction can be substantially free of an extent substantially solely in the longitudinal direction. As a result, the HF-properties (signal integrity) of the crimp ferrule 2 are improved. The free peripheries of the diameter compensation portion 22 mutually opposite in the circumferential direction Ur can be configured to be complementary and, in a crimped state of the crimp ferrule 2, be mutually opposite in a substantially form-fitting manner.

In the crimped state of the crimp ferrule 2, in the diameter compensation portion 22, a circumferential tooth (e.g. triangular or approximately triangular) of a circumferential flank can engage between two circumferential teeth (e.g. approximately triangular or triangular) of the circumferential flank opposite the former in the circumferential direction Ur. As a result, stranded wires of a braided shield are better captured when the ferrule 2 is crimped onto the non-circular internal cross section 50.

In order for the circular external cross section 20 of the crimp ferrule 2 to be configured here, the circumferential flanks 221, 222 are bent towards one another until the free peripheries thereof substantially bear on one another in the circumferential direction Ur (crimping), on the one hand. The non-circular internal cross section 50 can be only elastically deformed, only slightly elastically deformed, and in particular only in one 'plane'. When configuring the circular external cross section 20, the free peripheries of the diameter compensation portion 22 mutually opposite in the circumferential direction Ur can be joined to one another and/or joined inside one another in a form-fitting manner. The free peripheries here are directly mutually opposite on a single circumference of the crimp ferrule 2.

On the other hand, the assembly devices 211, 212, by way of the non-circular internal cross section 50 of an axial portion of the multi-core cable 5, clamp the latter between said assembly devices 211, 212 (crimping), thus mounting the crimp ferrule 2 on (assembly devices 211, 212) and on/over (circumferential flanks 221, 222) the non-circular internal cross section 50 of the multi-core cable 5.

The assembly tongues 2115, 2125 in the process may be bent radially inwards onto an axial portion of the multi-core cable 5 that has the non-circular internal cross section 50 (FIGS. 2, 3, and 5), so that this axial portion is clamped between the assembly tongues 2115, 2125. While the circular external cross section 20 of the crimp ferrule 2 is being configured, the circumferential flanks 221, 222 and thus also the tongue roots 2110, 2120 are furthermore bent towards one another (FIGS. 2, 3, and 5), so that this axial portion is furthermore clamped between the tongue roots 2110, 2120. Subsequently, a free longitudinal end portion of the cable shield 55 can be placed in a fully circumferential manner onto the crimp ferrule 2 in the crimped state of the latter.

Prior to the circumferential flanks 221, 222 being bent towards one another while crimping the crimp ferrule 2, the circumferential flanks 221, 222 can project in a substantially rectilinear manner from the circumferential center portion 220. That is to say that the respective circumferential flank 221, 222 extends tangentially out of the circumferential center portion 220. The circumferential flanks 221, 222, and also the tongue roots 2110, 2120, are imparted the curved shape thereof only once the crimp ferrule 2 is crimped, whereas the assembly tongues 2115, 2125 may maintain the substantial shape—but not the position—thereof.

In an assembly method according to the invention of a connecting device 0, partial stripping of a protective sheath 57 of a multi-core cable 5 first takes place in a first step I, wherein the cable shield 55 (for example a braided shield conductor 55) of the multi-core cable 5 is exposed. Complete pulling off or partial or complete removal can, of course, likewise take place. Subsequently, the crimp ferrule 2 is crimped to this free longitudinal portion (crimp-assembly method of a crimp ferrule 2 as a temporal portion of the first step I), as described above.

In a second step II subsequent to the first step I of the assembly method, a remaining free longitudinal end portion of the multi-core cable 5 is prepared for fitting inner (HF-) terminals. Here, depending on the multi-core cable 5, a dielectric or a respective electrical insulation of the inner conductors 51, 52 of the multi-core cable 5 is removed from a remaining free end portion at a minor spacing from the crimp ferrule 20 or the folded-over portion of the cable shield 55. Subsequently, the inner terminals 1 (in an embodiment two) are fitted to the multi-core cable 5. The fitting of the inner terminals 1 in the second step can take place e.g. by way of a method for crimping, (compacting) welding, soldering/brazing, etc.

In a third step III subsequent to the second step II of the assembly method, an outer, electrical (HF-) (crimp) terminal 3, in particular a shield contact sleeve 3, can be crimped onto/to the multi-core cable 5. Here, the shield contact sleeve 3 is crimped onto the crimp ferrule 2, or the folded-over portion thereof of the cable shield 55, on the one hand, and further at the rear crimped onto the protective sheath 57 of the multi-core cable 5, on the other hand. The pre-fabricated multi-core cable 5 herein is moved from above into the shield contact sleeve 30, which is open at the top, and/or vice versa, and/or from the rear into the shield contact sleeve 30, which is open at the rear, and/or vice versa. These steps I, II, III are repeated depending on the number of connecting devices 0.

An electrical entity according to the invention has an electrical connecting device 0, wherein the connecting device 0 is formed according to the invention, and/or the connecting device 0 is assembled on an electrical multi-core cable 5 by an assembly method according to the invention.

The entity can further have, e.g. in addition to an entity housing, at least one mechanical, electrical, electronic, optical and/or fluidic means or device. Such an entity can (also) be formed e.g. as an element, a device, a connector (twisted-pair connector, twin axial connector etc.), an assembled multi-core cable (twisted-pair cable, twin axial cable etc.), an assembly, a circuit board, a component, a module, a unit, an instrument, an appliance, an installation, a system, etc.

What is claimed is:

1. A crimp ferrule, comprising:

an assembly portion assembled on a non-circular internal cross section of a multi-core cable, the assembly portion has an assembly device establishing the crimp ferrule on the non-circular internal cross section, the assembly device has an assembly tongue connected by a tongue root to the crimp ferrule, the assembly tongue is rectilinear in a direction extending away from the tongue root and is bendable with respect to the tongue root, the assembly tongue is rectilinear in a crimped state of the assembly portion, the assembly device is one of a plurality of assembly devices arranged in a circumferential direction of the crimp ferrule; and a diameter compensation portion forming a circular external cross section of the crimp ferrule on the multi-core cable, the assembly portion and the diameter compensation portion are arranged successively in an axial direction of the crimp ferrule.

2. The crimp ferrule of claim 1, wherein the diameter compensation portion has a first circumferential flank and a second circumferential flank connected by a center portion, the first circumferential flank and the second circumferential flank are bent toward one another to form the circular external cross section.

3. The crimp ferrule of claim 1, wherein the assembly portion and the diameter compensation portion are arranged adjacently in the axial direction and do not overlap.

4. The crimp ferrule of claim 1, wherein the assembly tongue clamps the non-circular internal cross section.

5. The crimp ferrule of claim 1, wherein the tongue root projects in the axial direction from the crimp ferrule and the assembly tongue projects in the circumferential direction and/or in a radial direction from the tongue root.

6. The crimp ferrule of claim 1, wherein the assembly tongue is crimped from a circumferential position on the crimp ferrule in a radially inward manner onto the non-circular internal cross section.

7. The crimp ferrule of claim 1, wherein the non-circular internal cross section is clamped by the assembly device and a radially opposite region of the crimp ferrule.

8. The crimp ferrule of claim 1, wherein the non-circular internal cross section is clamped by an axial portion of the diameter compensation portion and a radially opposite portion of the diameter compensation portion.

9. The crimp ferrule of claim 1, wherein a pair of free edges of the diameter compensation portion opposite one another in the circumferential direction are complementary and form-fit in a crimped state of the crimp ferrule.

10. The crimp ferrule of claim 9, wherein, in the crimped state, a circumferential tooth of a first circumferential flank of the diameter compensation portion engages between a pair of circumferential teeth of a second circumferential flank of the diameter compensation portion.

11. The crimp ferrule of claim 1, wherein the crimp ferrule is formed materially in one piece or integrally.

12. An electrical connecting device, comprising:

the crimp ferrule according to claim 1.

13. A method of assembly of a crimp ferrule, comprising:

providing the crimp ferrule having an assembly portion and a diameter compensation portion; and crimping the assembly portion onto a non-circular internal cross section of a multi-core cable, the assembly portion has an assembly device establishing the crimp ferrule on the non-circular internal cross section, the assembly device has an assembly tongue connected by a tongue root to the crimp ferrule, the assembly tongue is rectilinear in a direction extending away from the tongue root and is bendable with respect to the tongue root, the assembly tongue is rectilinear in a crimped state of the assembly portion, the diameter compensation portion forms a circular external cross section on the multi-core cable, the assembly device is one of a plurality of assembly devices arranged in a circumferential direction of the crimp ferrule.

14. The method of claim 13, wherein a first circumferential flank and a second circumferential flank of the diameter compensation portion are bent toward one another to form the circular external cross section, a pair of free edges of the diameter compensation portion join to one another in a form-fitting manner to form the circular external cross section.

15. The method of claim 13, wherein the crimp ferrule is crimped onto a cable shield of the multi-core cable.

16. A method for assembling an electrical connecting device, comprising:

crimping the crimp ferrule onto a cable shielding of the multi-core cable by the method of claim 13.

* * * * *